United States Patent

[11] 3,586,948

[72] Inventors John Ingmar Broome
 Stralvagen 25, Sorberge;
 Bert Hjalmar Engman, Framnas C., Timra;
 Sven Nils Johannes Linnman,
 Stormastarvagen 15,, Liding 4; Per E. C.
 Udden, Nygation 1,, Timra, all of, Sweden
[21] Appl. No. 770,580
[22] Filed Oct. 25, 1968
[45] Patented June 22, 1971
[32] Priority Nov. 3, 1967
[33] Sweden
[31] 15136

[54] METHOD AND AN ARRANGEMENT OF CONTROLLING A DC MOTOR ON CONSTANT SPEED
 2 Claims, 6 Drawing Figs.
[52] U.S. Cl. .................................................. 318/341,
 318/332
[51] Int. Cl. .................................................. H02p 5/16
[50] Field of Search .......................................... 318/341,
 345, 331, 332

[56] References Cited
UNITED STATES PATENTS

| | | | | |
|---|---|---|---|---|
| 3,364,409 | 1/1968 | Schuepp | | 318/341 |
| 3,414,791 | 12/1968 | Munson | | 318/345 |
| 3,436,635 | 4/1969 | James | | 318/345 |
| 3,466,521 | 9/1969 | Lagier | | 318/341 |

Primary Examiner—Oris L. Rader
Assistant Examiner—Thomas Langer
Attorney—Fred Philpitt ABSTRACT: A speed control circuit, electrically in parallel with a controllable semiconductor, which is electrically in series with a DC motor, said control circuit including an RC circuit in which the capacitor, upon cutoff of said semiconductor, discharges through the resistor of said RC circuit with a discharge current which is proportional to the motor current just before cutoff until the voltage across the semiconductor has reached its stationary DC voltage value. The discharge current is caused to flow through the resistor of the RC circuit thereby causing a voltage drop, which is detected and stored in a capacitor. The difference between the maximum actual stored resistor voltage and a command voltage is applied to the controllable semiconductor means to govern the speed of the motor.

METHOD AND AN ARRANGEMENT OF CONTROLLING A DC MOTOR ON CONSTANT SPEED

The present invention relates to a method of controlling a direct current motor on constant speed, said motor being connected in series with a controllable semiconductor and subject to varying load. The controlling operation is effected by pulse-width modulation, i.e. changing the ratio of time between conducting and nonconducting periods of the semiconductor, and wherein a capacitor is contained in a circuit connected in parallel across the direct current motor. The invention also relates to an arrangement for controlling said direct current motor in accordance with said method.

The invention is primarily intended to be applied to electrically powered vehicles, such as, for instance, electrical wheelchairs for invalids intended primarily for outdoor use. When driving a wheelchair on broken ground, the electrical power supply for propelling the vehicle will have to be changed in dependence of the condition of the ground. Thus, for instance, the power will have to be increased when driving the vehicle up a curb and to be reduced when driving down the curb. A person with seriously reduced mobility often finds it difficult to handle such power control with sufficient rapidity and precision.

The object of the present invention is to provide automatical control of the speed of the vehicle in order to maintain the speed at a constant value, independently of the load on the motor, Thus, an outdoor wheelchair should be capable of climbing the curb without taking a ''jump'' after having cleared the obstacle, and to be moved smoothly down the curb without any jerks which could cause inadvertent changes of the position of the passenger. The invention is of course applicable to other electrically powered vehicles for other purposes.

It has been common practice to employ tachometer generators, for example, for controlling the speed of the motor at a constant value, by utilizing the speed-proportional voltage to automatically increase or reduce the power supply. Another method of measuring and computing the speed of an electric motor is based on the fact that, in certain cases, the speed of rotation is proportional to the rotor voltage. This latter method is more economical than using a tachometer generator. Contemporaneously with the development of semiconductor techniques, it has become increasingly usual to control motor power supply by pulse-width modulation of the voltage supplied to the motor, i.e. by varying the ratio of time between the conducting and nonconducting periods of a semiconductor connected in series with the motor. However, the voltage across the motor will not only be proportional to the rotational speed, but will also be influenced by the pulse-width as well as by the internal resistance and inductance of the rotor.

The invention is applicable on well-known DC power control circuits, as shown in FIGS. 1 and 2, comprising a capacitor electrically in parallel with the motor. The control circuit according to the invention comprises a RC circuit electrically in parallel with the semiconductor means, the capacitor of said RC circuit upon blocking of said semiconductor means being discharged through the resistor during the nonconducting periods of said semiconductor means with a discharge current proportional to the motor current just before cutoff. The control circuit further comprises sensing means for detecting and storing the maximum instantaneous value of the voltage across the resistor caused by the discharge current and means for comparing said maximum actual resistor voltage with a command voltage corresponding to the desired speed of the motor. The difference between the command and the actual voltages being supplied to said controllable semiconductor means to control the time ratio between its conducting and nonconducting periods.

A suitable embodiment of the invention comprises a capacitor and a diode thus arranged so that the instantaneous value of the voltage across the resistor in said RC circuit is charging a capacitor, the charge of which will correspond to the maximum instantaneous value across the resistor.

Some embodiments of the control speed circuit according to the invention will now be described more in detail by way of example reference being made to the accompanying drawings, in which.

Figure 1:
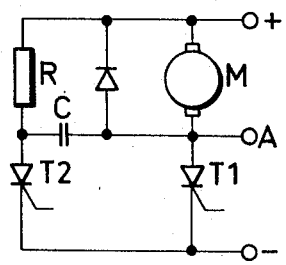
FIG. 1 shows a circuit for pulse-width modulation using alternately operating thyristors.

With reference to FIG. 1, the two thyristors T1 and T2 operate alternately, which means that when thyristor T1 is fired by a trigger pulse applied to its gate electrode, thyristor T2 is cutoff by means of a capacitor C, and vice versa. The capacitor C further contributes in ensuring that the voltage drop across the motor will not take place instantaneously, but with a certain continuous time delay during a predetermined time interval after cutoff of thyristor T1. A diode is connected in parallel across the motor M, giving the voltage pulses a certain, predetermined amplitude.

Figure 2:
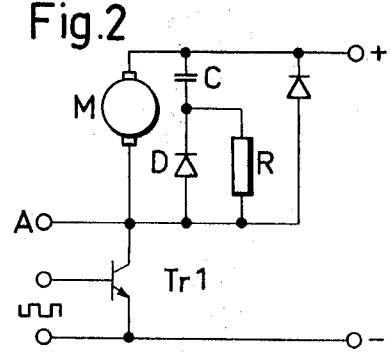
FIG. 2 shows a circuit for pulse-width modulation using one single transistor.

The circuit of FIG. 2 illustrates pulse-width modulation using a transistor Trl. A capacitor C is connected in parallel across motor M and in series with a parallel circuit comprising a diode D and a resistor R which effects the function of lowering the voltage across the motor relatively slowly after cutoff of the transistor. This will eliminate the danger of excessive power pulses in the collector of the transistor upon biasing the latter to cutoff.

Thus, in both of the circuits described above the voltage across the motor will drop continuously during a certain time period after the controllable semiconductors $T_1$ and $T_{rl}$, respectively, have been cutoff. The voltage crop across the motor and the voltage rise across the semiconductor after cutoff can be defined as the voltage-change per time unit, i.e. the voltage derivative $dU/dt$ during the transient lapse when the voltage increases. Consequently, an increase of the motor load decreases the motor speed and causes a decrease of the counter electromotive force of the motor, which in turn causes an increase of the motor current. When the semiconductor blocks this increased motor current will discharge the capacitor C more rapidly and consequently the stationary DC voltage value across the semiconductor will be reached more quickly, which also could be defined by the absolute magnitude of the voltage derivative $dU/dt$ during the transient lapse. In other words the rotational speed of the motor is directly proportional to the absolute magnitude of the voltage derivative and this concept according to the invention is utilized for measuring and controlling the rotational speed of the DC motor.

Figure 3:
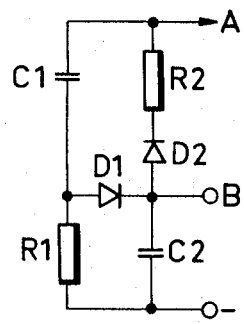
FIG. 3 shows a circuit for measuring the current through the motor.

The circuit of FIG. 3 is intended to be connected between point A and the negative terminal of any of the circuits of FIGS. 1 or 2. During the transient voltage variation, current will flow through a capacitor C1 and a resistor R1. This current is directly proportional to the voltage change per unit of time, i.e. to $dU/dt$, and therefore the current, and thus also the voltage drop across resistor R1, will be directly proportional to the current flow through the motor, which follows from the previous discussion. The instantaneous value of the voltage across resistor R1 is supplied through a diode D1 to a capacitor C2, which thus acts as a storage. Upon repeated reduction of the potential in point A, i.e. upon firing of the semiconductor, capacitor C2 will discharge through a diode D2 and a resistor R2, after which the capacitor is ready for next storage recording. During the entire interval of zero voltage across the motor, the voltage at point B will consequently be proportional to the load current through the motor at that instant when the voltage across the motor was interrupted. Therefore, during the entire time interval when the voltage $U_A$ (see FIGS. 6, a and b) is maintained across the semiconductor, the voltage across capacitor C2 can be detected in point B. Not until the semiconductor becomes conductive and the voltage across the same descends to zero, the capacitor will discharge through diode D2 and resistor R2.

However, as the motor contains a certain time constant, which depends on its internal inductance and resistance, the load current will increase during the entire time interval when current flows through the semiconductor. Thus, the load current will depend both on the pulse-width ratio and the counterelectromotive force generated in the rotor, said force being directly proportional to the speed of rotation. To eliminate any influence of pulse-width ratio, the circuit of FIG. 3 is completed with an RC circuit according to FIG. 4. Resistors R3 and R4 and capacitor C3 have an overall time constant corresponding to the time constant of the internal inductance and resistance of the motor. Thus, as the pulse-width ratio increases, the motor current will increase, giving rise to a voltage increase across capacitor C2, simultaneously as the meanvalue of the voltage across the semiconductor will drop due to the altered pulse-width. This will in turn cause capacitor C3 to be subject to a voltage drop equal to the voltage increase across capacitor C2. The sum of the voltages across capacitors C3 and C2, represented by the voltage between point B and the negative terminal, will thus be independent of the pulsewidth and exclusively dependent of the speed of the motor.

Figure 4:
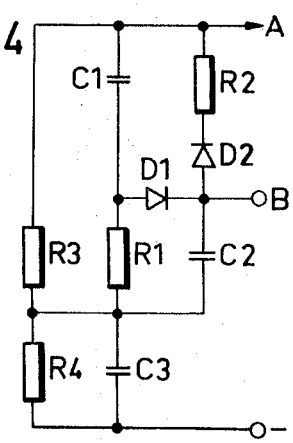
FIG. 4 shows a circuit for measuring the current through the motor, taking in account the influence of pulse width as well as the internal resistance and inductance of the motor.
Figure 5:
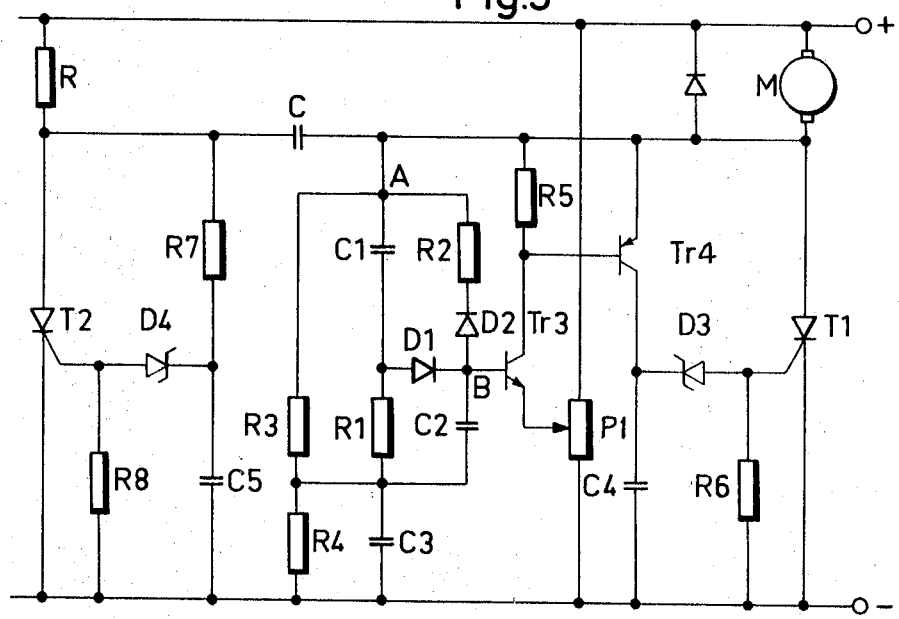
FIG. 5 shows how the circuit of FIG. 4 is incorporated in the circuit for pulse-width modulation with thyristors according to FIG. 1, and FIGS. 6, a and b, show the current-to-voltage characteristics of the circuit shown in FIG. 5 for two different load conditions, respectively.

The circuit of FIG. 4 can be applied to a pulse-width modulator according to FIG. 1, thereby forming a circuit according to FIG. 5. In said last mentioned FIG., T1 is a main thyristor which is gated by a trigger diode D3 after charging of a capacitor C4 to the breakdown voltage of said diode. An auxiliary thyristor T2 is extinguishing thyristor T1 via a capacitor C, which has been charged in advance by the voltage across a resistor R. Each time the main thyristor T1 fires, the auxiliary thyristor T2 will be extinguished by the influence of capacitor C. At this instant, a charging of a capacitor C5 will commence through resistors R and R7. After a certain time, capacitor C5 has reached the breakdown voltage for a trigger diode D4, and causes firing of auxiliary thyristor T2 and extinction of main thyristor T1. This time is constant which means that the motor will always be supplied with pulses of equal width. The pulsewidth ratio can be varied by altering the time spacing of the pulses. The motor speed is set by means of a potentiometer P1. If the motor speed is lower than that set speed, the potential in point B will be higher than the potential in the slider of the potentiometer, thereby controlling a transistor Tr3. The output signal of transistor Tr3 is amplified by a transistor Tr4, the collector current of which charges capacitor C4 at a rate which is the higher, the greater the potential difference is between point B and the slider of potentiometer P1. This will shorten the time spacing between the pulses supplied to the motor, whereby the power supply, and thus the motor speed, will increase until the potential difference between the points just mentioned has been equalized, which thus corresponds to the set speed as desired.

Figure 6:
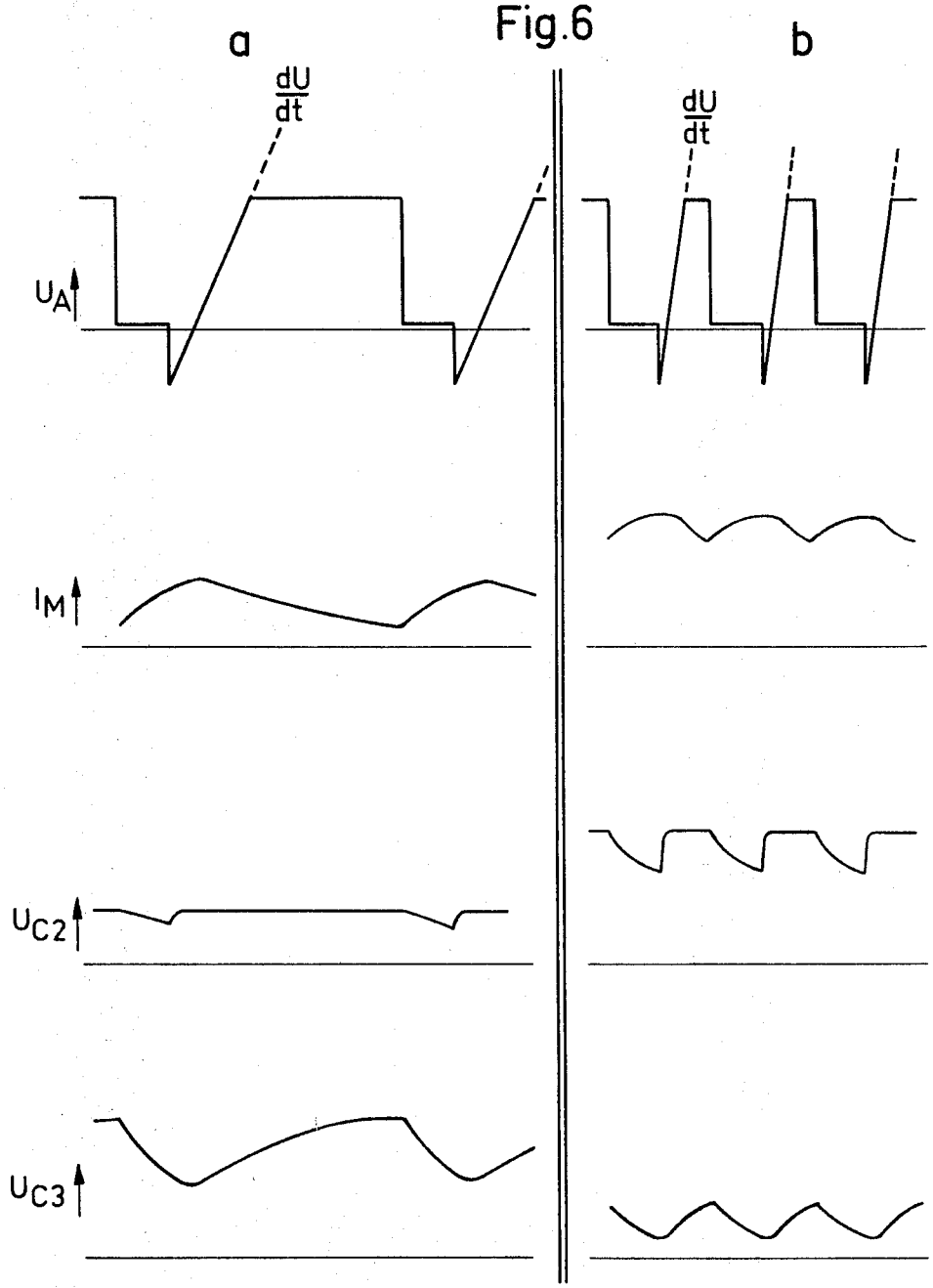

FIGS. 6, a and 6, illustrate the change in pulse-width ratio in terms of voltage $U_A$ across the semiconductor device, measured between point A and the negative terminal. They further show how the current $I_M$ through the motor, as well as the voltages $U_{C2}$ and $U_{C3}$ across capacitors C2 and C3, respectively, vary in case of constant speed and varying load. In FIG. 6a, the load current through the motor is comparatively low, which corresponds to a low value of the voltage derivate $dU/dt$. FIG. 6b shows how the motor current $I_M$ increases in spite of the speed of the motor being maintained at a constant value, which is effected by changing the pulse-width ratio from a low value according to FIG. 6a into a high value according to FIG. 6b. Simultaneously with the increase of motor current $I_M$ and voltage across capacitor C2, the voltage across capacitor C3 will decrease correspondingly. Thus, the sum of voltages $U_{C2}$ and $U_{C3}$ across the capacitors C2 and C3, respectively, will remain substantially constant at constant motor speed, and independent of any change in the pulse-width ratio.

We claim:

1. A control circuit for maintaining constant the speed of a DC motor which is subjected to varying loads by varying the time ratio between conducting and nonconducting periods of controllable semiconductor means in series with said motor comprising, detecting means to detect the motor current subsequent to said controllable semiconductor means being turned off, storage means to store a quantity related to the maximum value of said current detected by said detecting means, means for comparing said quantity with a command voltage corresponding to the desired speed of said motor and detecting the difference, and means for applying said difference to said controllable semiconductor means to vary the ratio between its conducting and nonconducting periods, wherein said detecting means includes RC circuit means electrically in parallel with said controllable semiconductor means, through which a current flows, when said controllable semiconductor means is turned off, which is proportional to motor current prior to the time said controllable semiconductor means is turned off, and developing across resistance means included in said RC circuit means a voltage proportional thereto, and said storage means includes capacitance means connected to said resistance means to store the maximum instantaneous value of the voltage developed across said resistance means.

2. A circuit according to claim 1 which further includes second R circuit means, also electrically in parallel with said RC semiconductor means, with a time constant proportional to the time constant of said motor, capacitance means included in said second RC circuit means being connected to said means for comparing through said storage means.